Patented Feb. 13, 1923.

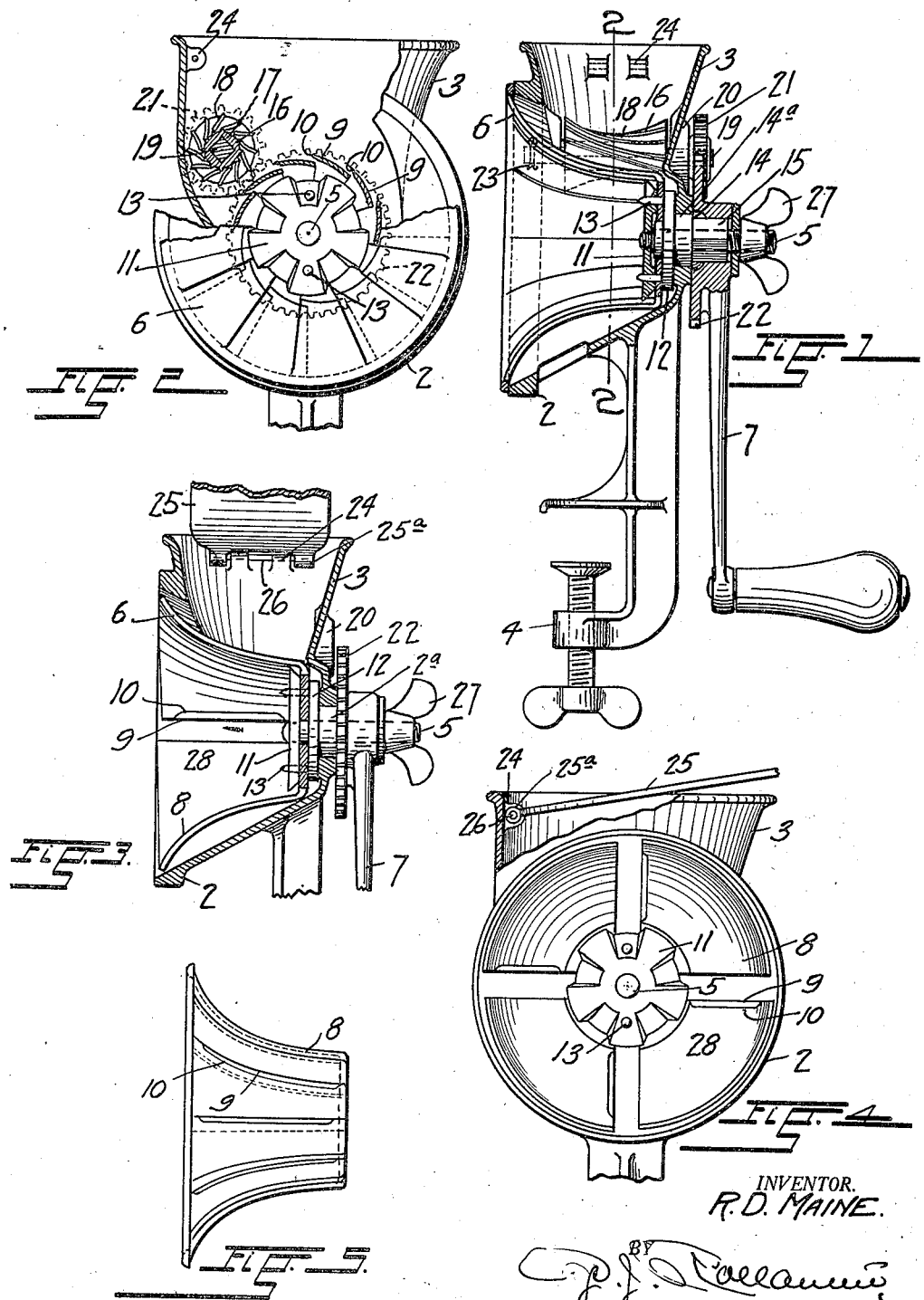

1,444,975

UNITED STATES PATENT OFFICE.

ROY D. MAINE, OF DENVER, COLORADO, ASSIGNOR OF ONE-THIRD TO JOHN W. JONES, OF DENVER, COLORADO.

POTATO PEELER.

Application filed April 26, 1922. Serial No. 556,693.

*To all whom it may concern:*

Be it known that I, ROY D. MAINE, a citizen of the United States, residing at Denver, in the county of Denver and State of Colorado, have invented certain new and useful Improvements in Potato Peelers, of which the following is a specification.

This invention relates to potato cutting machines, its main object being to provide a simple, convenient and efficient machine for peeling or scraping potatoes or other roots, fruits or vegetables and subsequently cutting the same into slices for use.

Another object of the invention is to provide in a machine of the above described character a rotary gouging member adapted to remove the eyes or decayed portions from the potato.

Still another object of the invention is to provide means by which the potato is maintained in constant engagement with the cutting surface without bringing the operator's hand into contact therewith.

To these ends, the invention consists in the construction, combinations and arrangement of parts shown in the accompanying drawings, in the various views of which like parts are similarly designated, and in which—

Figure 1 represents a sectional elevation of my improved potato cutter;

Figure 2, a section on the line 2—2, Figure 1;

Figure 3, a section similar to Figure 1, showing the application of a slicing member in the place of the peeling member shown in Figure 1;

Figure 4, an end view of the device shown in Figure 1, partially in section; and Figure 5, a side elevation of the peeling member of the machine.

Referring to the drawings, the reference numeral 2 designates a housing having at its top a hopper 3, through which the potatoes are fed to the peeling and slicing members, and at its under side a clamp 4 by means of which it may be fastened at the edge of a work-bench or table.

The housing provides a chamber of circular section, the inner surface of which is preferably of outwardly flaring form open at its outer end and having at its closed end an opening $2^a$ for the admission of an axially bored arbor 14, in which is fitted a bolt 5 for the cooperative connection of a rotary cutting member 6 and a hand crank 7.

The cutting member 6 of the device consists of a tapering circumferentially dished shell 8 open at one end and formed to loosely fit within the chamber of the housing. The shell has in its circumferential wall a plurality of equidistantly arranged longitudinal slots 9 and integral cutting blades 10 which extend slantingly along one of the edges thereof.

The open end of the hollow cutting member coincides with the open end of the chamber and the member is rotatably supported in the chamber through the medium of the above mentioned arbor 14 and the bolt 5 which has at one end a disk-shaped head 11, adapted to fit snugly against the inner surface of the closed end of the cutting member. The arbor comprises a cylindrical part $14^a$ which is rotatably fitted in the opening $2^a$ of the housing, an angular shank 15 at an end thereof, upon which the hand-crank 7 is fitted, and a flange 12 at the opposite end of the same which has two or more dowel pins 13 passing through apertures in the closed end of the cutting member, into therewith registering holes in the head of the bolt to establish the rotative continuity of the parts. A wing nut 27 applied at the protruding screw-threaded end of the bolt clamps the cutting member, the arbor and the handle in their cooperative relation.

Disposed above the cutting member 6, inside the hopper 3, is a gouging member for removing the eyes or decayed portions of potatoes subjected to the peeling action of the device.

The gouging member consists preferably of a hub 17 from which extend a series of curved digging members 18, the outer edges of which are concaved and sharpened to engage with the potato inserted in the hopper 3. The hub is mounted on the squared body-portion of a shaft 19, an end of which is rotatably supported in a bearing 20 on the housing. A cotter pin 23 at the free end of the shaft prevents relative displacement of the gouging member, and the shaft carries upon its end protruding through the bearing, a pinion 21 which meshes with a toothed wheel 22 on the hand crank 7.

Lugs 24 within the housing above the gouging member are provided with openings for the insertion of a bolt 26 which extends through knuckles 25ª on a hand guard 25 to serve as a hinge for the latter. The guard 25 being free to move up or downwardly in the hopper, is in practice employed to hold the potato in continuous engagement with the rotary cutting element of the device, and eliminates all danger of cutting the hand of the operator.

In the operation of the machine, the potatoes are fed into the hopper at the top of the housing and are peeled by being pressed against the rotary cutting member through the medium of the hand guard, while the cutting member is rotated by the hand crank 7. After the skin of the potato is thus removed to a thickness more or less depending on the force with which it engages the rotary cutting member, eyes or decayed parts appearing in its bared surface are readily removed by bringing the potato in contact with the blades of the gouging element, which is continuously rotated by its gear connection with the handle 7.

The potato may subsequently be sliced in the same machine by replacing the peeling member 6 by a slicing member of similar form and construction, designated by the numeral 28 in Figures 3 and 4 of the drawings. The replacement is readily effected by removing the wing nut 27 from the bolt 5, which permits of the cutting member and the arbor being passed through the open end of the housing, and of detaching the cutting member from the arbor and replacing it by another. The slicing member differs from the peeling member only in the shape of its slots and the cutting blades extending along an edge thereof, and it will be readily understood that by substituting a similarly formed scraping member for either the peeling member or the slicing member, the machine may be used to cut the potato into still smaller parts. Inasmuch as the construction of the scraping member is obvious and does not form a part of the present invention, it has not been shown in the drawings.

Having thus described my improved cutting machine, I desire it understood that variations in the construction and arrangement of the parts thereof may be resorted to within the spirit of my invention as defined in the following claims.

What I claim and desire to secure by Letters-Patent is:—

1. In a potato cutting machine of the character described, the combination of a housing having a chamber open at one end and a feed opening connecting with the chamber, a cutting member in said chamber open at one end and apertured at its opposite end, a bored arbor rotatably mounted on the housing and having dowel pins fitted in the apertures of the member, a bolt having a head bearing interiorly of the cutting member and engaged by said dowel pins, a hand crank connected with the arbor, and a nut on the bolt, bearing on the crank.

2. In a potato cutting machine of the character described, the combination with a housing having a chamber open at one end and a feed opening connecting with the chamber, of a peeling member in said chamber, and a gouging member in the feed opening adapted to remove the eyes and decayed portions of a potato engaged by the peeling member.

3. In a potato cutting machine of the character described, the combination with a housing having a chamber open at one end and a feed opening connecting with the chamber, of a peeling member in said chamber, and a rotary gouging member in the feed opening comprising a circumferentially concaved roller having a plurality of curved peripheral cutting blades adapted to remove the eyes and decayed portions of a potato engaged by the peeling member.

4. In a potato cutting machine of the character described, the combination with a housing having a chamber open at one end and a feed opening connecting with the member, of a peeling member in said chamber, and a rotary gouging member in the feed opening connected with the peeling member for synchronous operation.

5. In a potato cutting machine of the character described, the combination of a housing having a chamber open at one end and a feed opening connecting with the chamber, a peeling member in the chamber, a shaft extending exteriorly of the housing, a gouging member on the shaft inside the feed opening, a pinion on the shaft, a hand crank in operative connection with the peeling member, and a toothed wheel on the crank meshing with the pinion.

6. A potato cutting machine comprising a housing having a chamber open at an end, and a feed opening connecting with the chamber, a rotary cutting member in the chamber and a rotary gouging member in the feed opening above the cutting member, adapted to engage with a potato passed to the cutting member through said opening.

7. In a potato cutting machine of the character described, the combination with a housing having a chamber open at one end and a feed opening connected with the chamber, of a cutting member in said chamber having a tapering circumferentially dished and longitudinally slotted surface, and correspondingly formed cutting blades at an edge of its slots.

8. In a potato cutting machine of the character described, the combination of a housing having a straight conical chamber open at its larger end and a feed opening connected with the chamber, and a rotary longitudinally slotted cutting member fitted at its ends in said chamber and circumferentially dished to provide a space inside the chamber between its said ends, and having correspondingly formed cutting blades along an edge of its slots.

In testimony whereof I have affixed my signature.

ROY D. MAINE.